United States Patent [19]

Nguyen

[11] Patent Number: 4,914,652
[45] Date of Patent: Apr. 3, 1990

[54] METHOD FOR TRANSFER OF DATA BETWEEN A MEDIA ACCESS CONTROLLER AND BUFFER MEMORY IN A TOKEN RING NETWORK

[75] Inventor: Hang Diem Nguyen, Fremont, Calif.

[73] Assignee: Advanced Micro Devices, Inc., Sunnyvale, Calif.

[21] Appl. No.: 226,610

[22] Filed: Aug. 1, 1988

[51] Int. Cl.⁴ .................................................. H04J 3/02
[52] U.S. Cl. ..................................................... 370/85.5
[58] Field of Search ........................ 370/85, 86, 94, 60, 370/89, 85.4, 85.5, 94.1; 340/825.05, 825.5

[56] References Cited

U.S. PATENT DOCUMENTS 4,652,874 3/1987 Loyer ........................................ 370/86

Primary Examiner—Robert L. Griffin
Assistant Examiner—Chin Wellington
Attorney, Agent, or Firm—Fliesler, Dubb, Meyer & Lovejoy

[57] ABSTRACT

A method is provided for use in a Token ring network including a plurality of stations serially connected by a transmission medium so as to form a closed loop on which packets of data are circulated, wherein each respective station includes a media access controller and a buffer memory, the method including the steps of transferring data of a respective packet from a media access controller to a buffer memory; storing the data in a sequence of contiguous memory locations in the buffer memory; in the course of the step of transferring the data, generating status information for the data; after said step of storing the data, storing the status information in the buffer memory contiguously with the stored data at the beginning of the sequence of memory locations in which the data are stored.

12 Claims, 7 Drawing Sheets

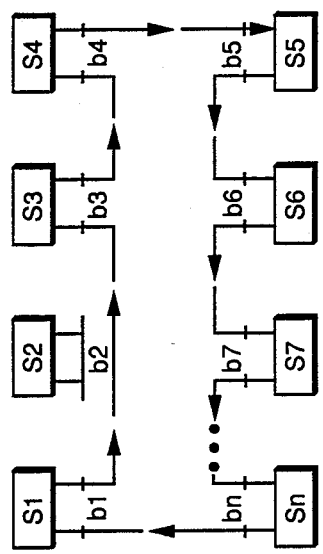
FIG._1.
(PRIOR ART)
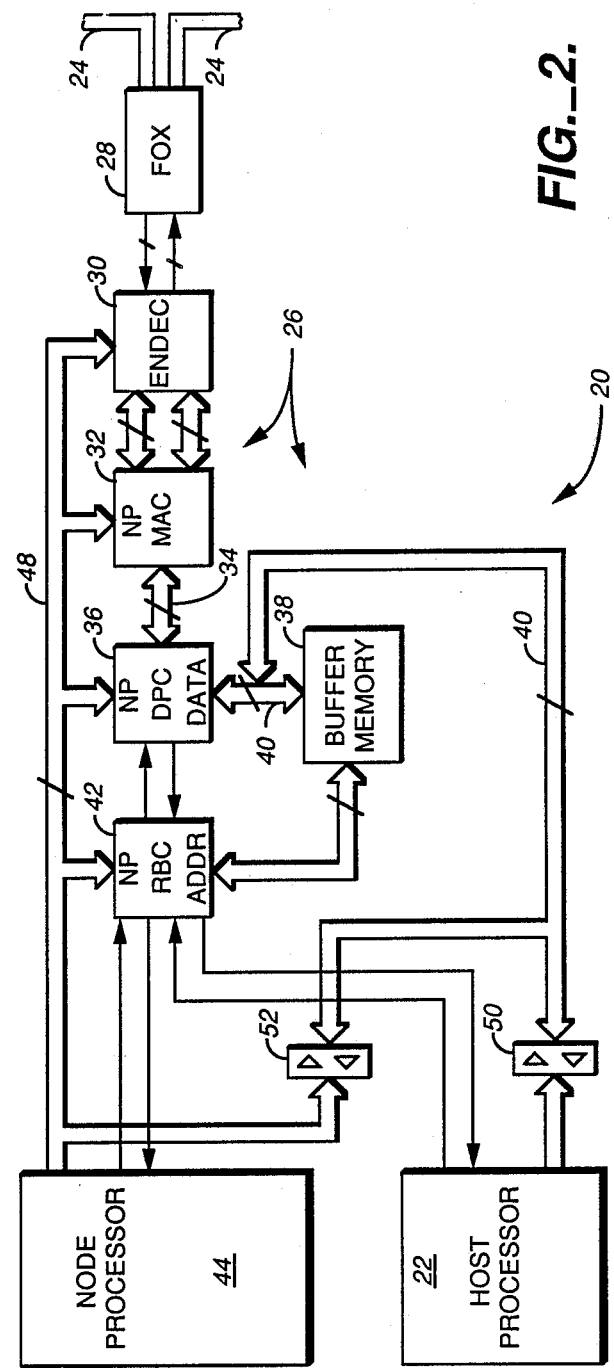
FIG._2.

FIG._3.
FIG._4.
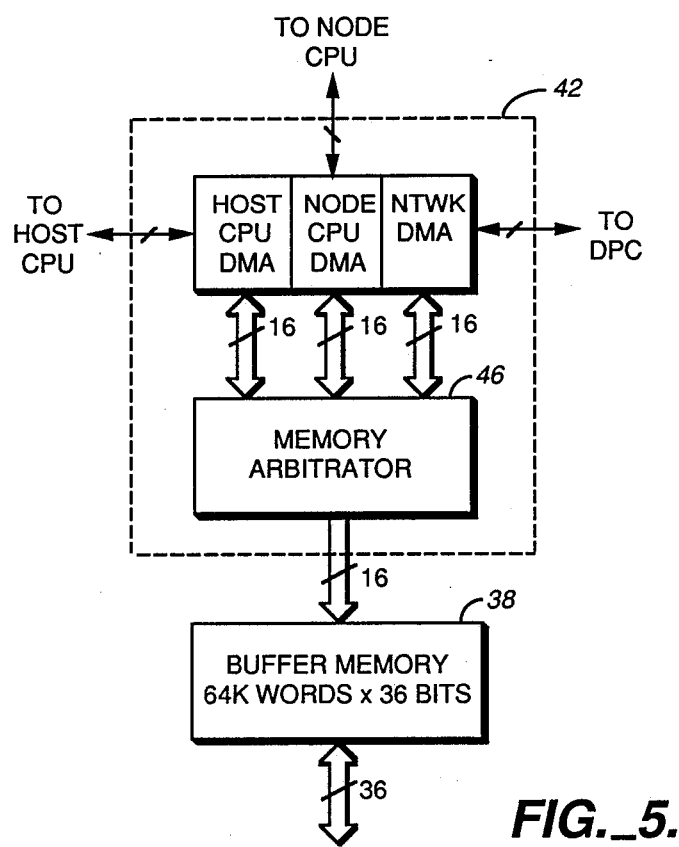
FIG._5.

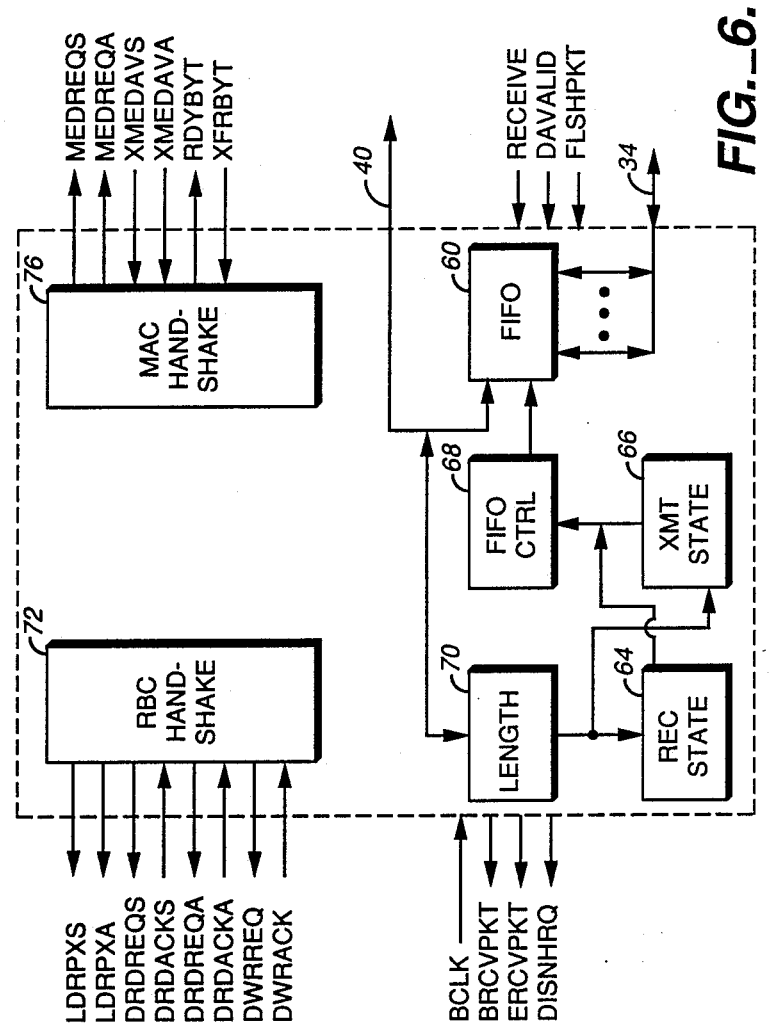

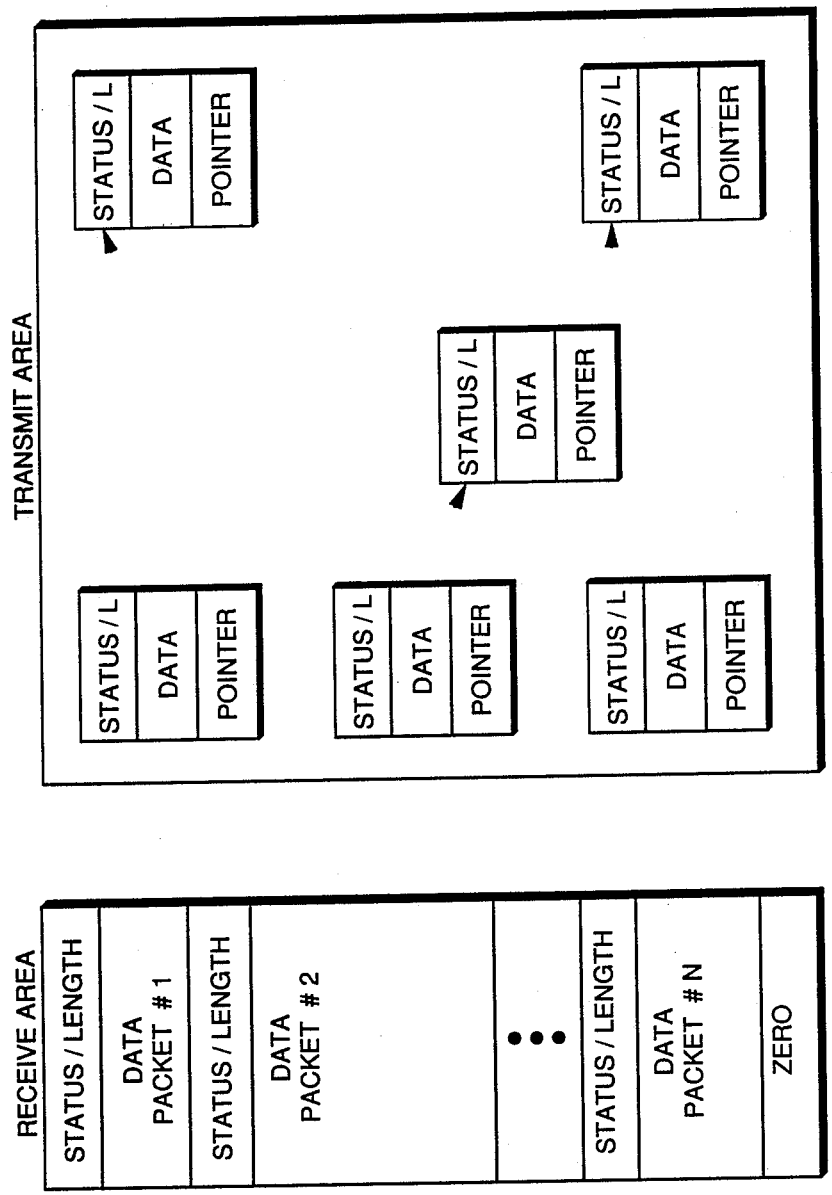

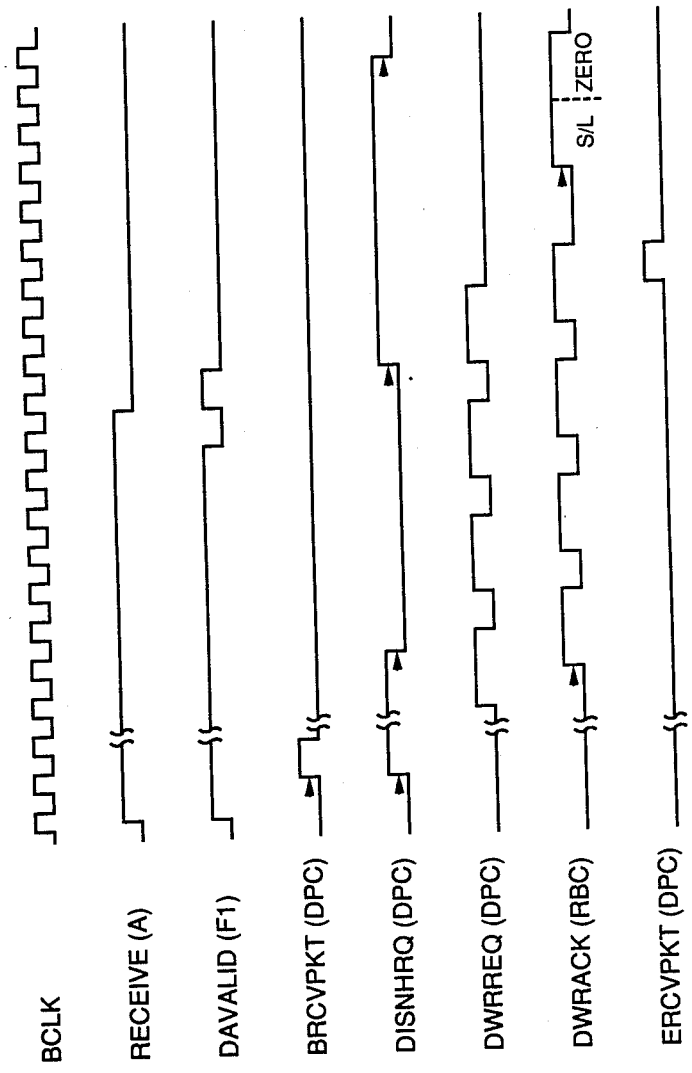
FIG._9.

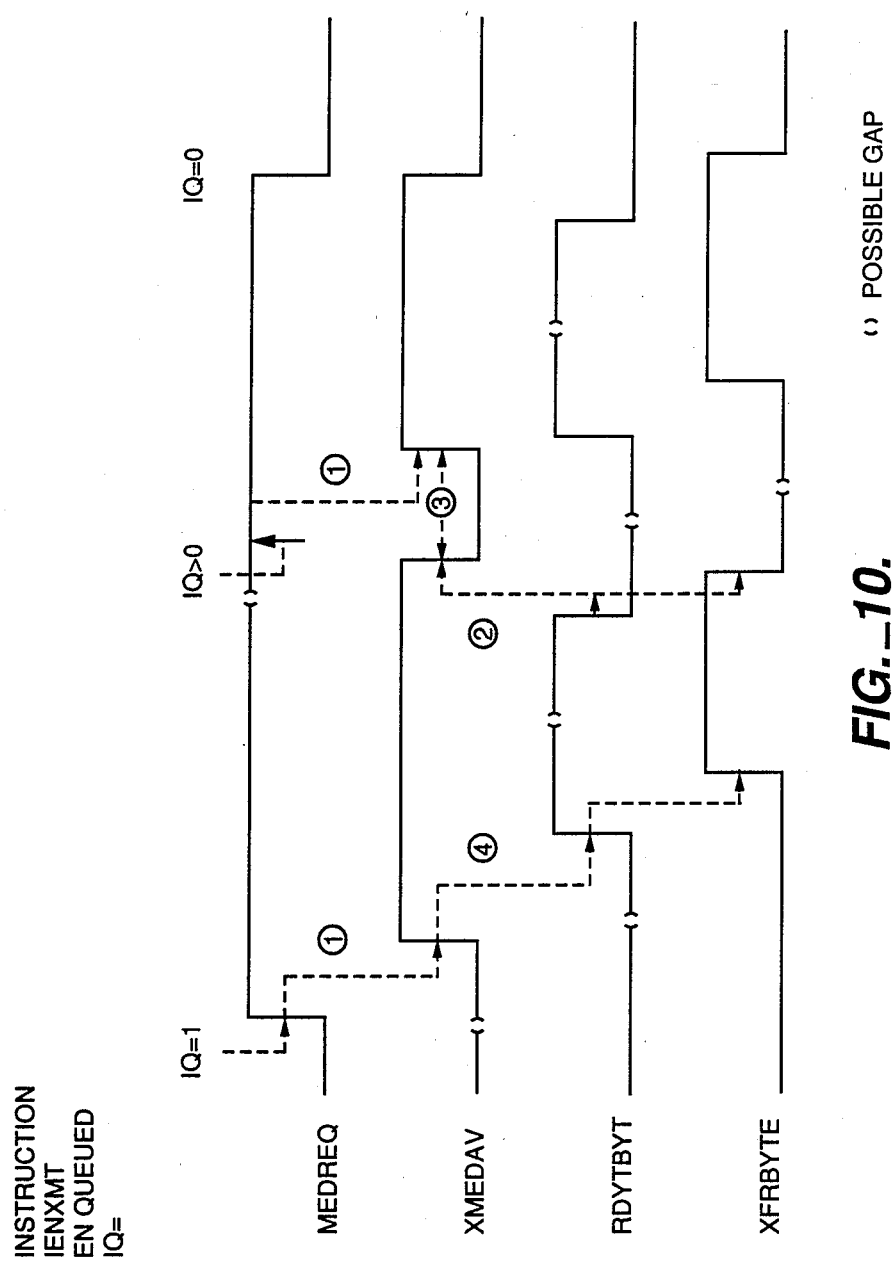
FIG._10.

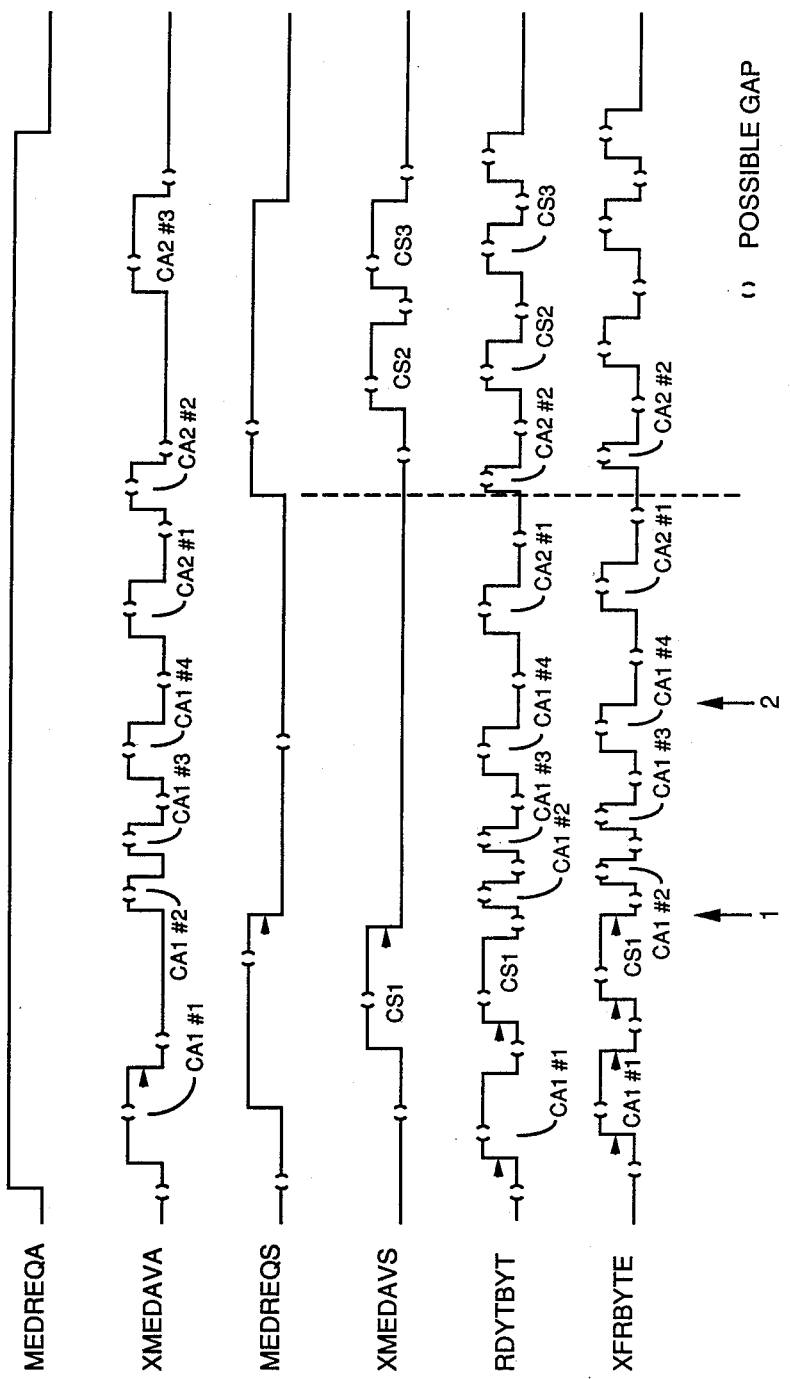
FIG._II.

METHOD FOR TRANSFER OF DATA BETWEEN A MEDIA ACCESS CONTROLLER AND BUFFER MEMORY IN A TOKEN RING NETWORK

BACKGROUND OF THE INVENTION

1. Field of the Invention

The invention relates generally to Token ring networks including a plurality of stations serially connected by a transmission medium so as to form a closed loop on which packets of data are transferred, and more particularly to the transfer and storage of data within individual stations of such networks.

2. Description of the Related Art

A Token ring network comprises a collection of stations serially connected by a transmission medium so as to form a closed loop. The illustrative drawings of FIG. 1, depict a typical Token ring network. Information is transmitted sequentially, as a stream of symbols from one active station to the next. Inactive stations are bypassed. In the network of FIG. 1, information is serially transmitted from station S1 to S3 and from stations S3 through station Sn. Station S2 is bypassed. Station S2 is bypassed through the action of its bypass means b2. The transmission path of stations S1 through Sn can be reconfigured through the use of bypass means, b1 through bn.

In operation, each station regenerates and repeats symbols transmitted on the transmission medium and serves as a mechanism for attaching one or more devices to the network so that the attached devices can communicate with each other. In practice, for example, such attached devices can be computers and associated peripheral equipment.

Data circulated on the network are transmitted onto the transmission medium by the individual stations. The data typically circulate on the medium in packets. Each packet ordinarily includes a destination address indicating the address of the station to which the data packet is destined. In at least one Token ring network, when a data packet reaches its destination station that station copies the data and repeats the packet onto the medium. Finally, the station that originally transmitted the data packet onto the transmission medium removes it from circulation.

In a typical Token ring network, individual stations gain the right to transmit packets onto the medium by detecting a Token that circulates throughout the network. The Token is a control symbol. Any station, upon detecting the Token, may "capture" the Token and remove it from the transmission medium. Only a station that has captured the Token can transmit data packets to the transmission medium. After transmitting its data packets to the medium, a station transmits onto the network a new Token, which then may be captured by another station.

A Token-holding timer, or equivalent means, limits the length of time during which any individual station may use or occupy the medium before passing the Token.

The American National Standard For Information Systems has issued a proposed ANSI X3T9.5 Specification for Fiber-Distributed Data Interface (the FDDI Standard) which describes a media access control (MAC) protocol intended for use in high-performance multistation networks. The protocol is intended to be effective at 100 megabits per second using a Token Ring Architecture and Fiber Optics as the transmission medium.

The FDDI Standard establishes rules for the transmission of packets by individual stations to the transmission medium and for the reception of packets by individual stations from the transmission medium. For example, the Standard requires that a station transmit only complete packets, and not partial packets. If the allotted time during which a station can hold a Token expires during the transmission of a packet, the Standard requires the station to finish transmitting that packet before surrendering access to the medium and generating a new Token. Furthermore, for example, the Standard requires that each individual station extract packets from the transmission medium immediately upon their arrival at the station.

Thus, a Token ring network can have relatively stringent rules governing packet transfers between individual stations and the transmission medium. Such rules are important for efficient operation of the overall network.

Similarly, individual stations typically invoke rules for the efficient use of data packets while those packets reside at the station. These rules often involve schemes for efficiently storing data in memory so that they are readily available for use.

In order to comply with network rules governing data packet transfers to and from the transmission medium, and to also comply with individual station rules governing data storage, an effective method for transferring data between the transmission medium and memory of individual stations is needed. The present invention meets this need.

SUMMARY OF THE INVENTION

The invention provides a method for use in a Token ring network which includes a plurality of stations serially connected by a transmission medium so as to form a closed loop on which packets of data are circulated. Each station of the network includes a media access controller for scheduling and routing data transmissions on the transmission medium. Each station also includes a buffer memory and a processor for controlling the operation of the station.

In one alternative, the method includes a step of transferring data of a respective packet from the media access controller to a buffer. The data of the packet are stored in a sequence of contiguous memory locations. In the course of transferring the data, status information is generated concerning the data. After storing the data, the status information is stored in the buffer memory contiguously with the stored data at the beginning of the sequence of memory locations in which the data are stored.

This first alternative advantageously permits the storage of status information provided by the media access controller at the beginning of a packet of data stored in the memory buffer despite the fact that the data in the packet was stored before the status information was complete. The storage of status information at the beginning of the packet facilitates the use of the buffer memory as a FIFO.

In another alternative, the invention includes the step of storing a plurality of packets of data in a buffer memory. The media access controller is requested to accept a transfer from the buffer memory of at least one of the plurality of packets. After the capture of a Token from the closed loop, at least one of the packets of the plurality is transferred from the buffer memory to the media access controller. The media access controller is notified of the transfer of that packet before a next packet is transferred to it.

This second alternative advantageously permits the media access controller to know when a complete packet has been transferred out of buffer memory. The media access controller then can interrupt a transmission between packet transmission and can thereby avoid compromising the integrity of any packets in the course of their transmission.

These and other features and advantages of the present invention will become more apparent from the following detailed description of an exemplary embodiment thereof, as illustrated in the accompany drawings.

BRIEF DESCRIPTION OF THE DRAWINGS

The purpose of and advantages of the present invention will be apparent to those skilled in the art from the following detailed description in conjunction with the appended drawings in which:

FIG. 1 is a block diagram of a typical Token ring network architecture;

FIG. 2 is a block diagram of a representative station of a Token ring network;

FIG. 3 is an illustration of the format of a Token packet that can circulate on the Token ring network of FIG. 1;

FIG. 4 is an illustration of the format of a data packet that can circulate on the Token ring network of FIG. 1;

FIG. 5 is an illustrative block diagram showing details of the RAM Buffer Controller of the station of FIG. 2;

FIG. 6 is an illustrative block diagram showing details of the Data Path Controller of the station of FIG. 2;

FIG. 7 is an illustrative drawing depicting the organization of data in the Receive Area of the buffer memory of the station of FIG. 2;

FIG. 8 is an illustrative drawing depicting the organization of data in the Transmit Area of the buffer memory of the station of FIG. 2;

FIG. 9 is an illustrative timing diagram for the Receive protocol handshake between the MAC and the DPC of the station of FIG. 2;

FIG. 10 is an illustrative timing diagram for the Transmit protocol handshake between the MAC and the DPC of the station of FIG. 2; and FIG. 11 is an illustrative timing diagram for the transmit handshake protocol of FIG. 10 for the transmission of multiple linked chains of packets.

DETAILED DESCRIPTION OF THE PREFERRED EMBODIMENT

The present invention comprises a novel method for monitoring and controlling transfers of data within individual stations of a Token ring network. The following description is presented to enable any person skilled in the art to make and use the invention, and is provided in the context of a particular application and its requirements. Various modifications to the preferred embodiment will be readily apparent to those skilled in art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Referring to the illustrative drawings of FIG. 2, there is shown a block diagram illustrating a representative station 20 of a Token ring network which can use the method of the present invention. The station 20 includes a Host processor 22 which, for example, can be a mainframe, work-station, minicomputer, or computer peripheral (such as a disk drive or a printer). The Host 22 is interfaced to the transmission medium 24 of a Token ring network. In a present embodiment, the medium 24 comprises a fiber optic medium which interconnects multiple stations in a Token ring network.

The Host 22 interfaces with the medium 24 through a data interface 26 which meets the ANSI X3T9.5 Fiber Distributed Data Interface (FDDI) Standard. It will be appreciated that the principles of the invention can apply to other data interfaces as well.

The data interface 26 includes a fiber optic transceiver (FOX) 28 which performs conversions between optical and electrical signals. The FOX 28 serially receives optical bits from the transmission medium 24, and it serially transmits optical bits to the medium 24. The FOX 26 converts optical bits received from the medium 24 to electrical bits for internal use by the station 20, and it converts electrical bits provided internally by the station 20 into optical bits for transmission onto the medium.

An Encoder/Decoder ENDEC 30 transfers data between the FOX 28 and a Media Access Controller (MAC) 32. The ENDEC 30 can convert a serial bit stream received from the medium 24 by the FOX 28 into an 8-bit parallel stream which is transferred to the MAC 32. Conversely, the ENDEC 30 can convert an 8-bit parallel stream received from the MAC 32 into a serial bit stream for transfer to the FOX 28.

The MAC 32 performs functions which relate to the protocol involved in the transfer of packets between the station 20 and the transmission medium 24. For example, the MAC 32 determines when the station 20 can transmit onto the medium 24 and when it must receive from the medium 24. It also implements the logic required for Token handling and for the recognition of addresses in packets transmitted on the medium.

When the station 20 transmits packets to the medium 24, the MAC 32 receives 8-bit bytes on Y-bus 34 from a Data Path Controller (DPC) 36 and provides 8-bit bytes to the ENDEC 30. Conversely, when the station 20 receives packets from the medium 24, the MAC 32 receives 8-bit bytes from the ENDEC 30, and transfers 8-bit bytes to the DPC 36 via Y-bus 34.

The FDDI Standard specifies distinct formats for the transmission of Tokens and for the transmission of data packets. FIG. 3 illustrates a format for Token transmission. FIG. 4 illustrates a format for data packet transmission.

In accordance with the FDDI Standard, the basic unit of information transmitted on the medium 24 is a symbol. Data packets are separated from each other by a prescribed number of Preamble (PA) symbols. The data (DATA) in the packets is preceded by a start delimiter (SD) which establishes byte synchronization. After the SD, a frame control field (FC) specifies the type of packet. Next, follows a destination address (DA) and a source address (SA). After these fields follows the actual data (DATA). The packet terminates with a frame check sequence (FCS) in the form of a cyclic redundancy check (CRC) field. Also, there follow a terminator symbol (T) and a minimum of three indicators: error (E), address (A) and copied (C). Each of these three is either in a Set or a Reset state. The E, A and C indicators are used by a destination station to provide information to a source station about the success of the packet reception.

Error is Set in case of a detected data corruption error. The address indicator is Set to indicate that the destination station recognized the address as valid. Finally, the copied indicator is Set to indicate the successful storage of the data (DATA) in buffer memory of the destination station.

Upon receiving a data packet, the MAC 32 strips away all preamble and start delimiters, and transfers the data (DATA) in the data packet to the DPC 36 which, in turn, transfers the data to buffer memory 38 for storage. Similarly, the MAC 32 strips away all postamble and end-of-packet of delimiters. The MAC 32 checks incoming data packets for destination address and notifies the DPC 36 if an address mismatch is detected. The DPC causes stored data to be discarded or "flushed" from buffer memory 38, as explained below, upon detection by the MAC 32 of an address mismatch.

The MAC 32 also generates and checks CRC on the received data packets. Furthermore, it generates status bits which identify station conditions and packet status, such as the E, A and C bits which are transferred to the DPC 36. The packet status information is provided by the MAC 32 for storage in buffer memory 38. The MAC 32 and the DPC 36 coordinate transfers of data between the MAC 32 to the DPC 36 on Y-bus through the use of a novel handshake protocols described more fully below.

Access to the medium 24 is controlled by a rotating Token that determines which station has the right to transmit data packets on the medium 24 at any given time. The MAC 32 transfers data packets received from the medium to the DPC 36 for storage in buffer memory provided, of course, that the packets are addressed to that station 20. The MAC 32 also repeats data packets received from the medium 24, and it refrains from transmitting new packets onto the medium until it captures the Token. Upon capturing the Token, the MAC 32 either repeats the Token on the medium 24 or holds it. The MAC 32 can hold the Token for only a prescribed period of time. During that time it can transmit data packets onto the medium 24.

It will be appreciated that the precise nature of the MAC 32 depends upon the nature of the Token ring network in which it is employed. In essence, the MAC determines when the station 20 can transmit onto the medium 24, and it controls the interaction between the station 20 and the medium 24.

The DPC 36 converts data (DATA) received from the medium 24 from 8-bit bytes to 32-bit (long word) format. Conversely, it converts data (DATA) to be transmitted to the medium 24 from the 32-bit long word format in which it is stored in buffer memory 38 to the 8-bit byte format.

When the station 20 is receiving a data packet from the medium 24, the MAC 32 provides 8-bit bytes of data on Y-bus 34. The DPC 36 converts the 8-bit bytes into 32-bit long words, and provides the long words to D-bus 40 for storage in buffer memory 38. When the station 20 is transmitting onto the medium 24, the DPC 36 converts 32-bit long words transferred from the buffer memory 38 via D-bus 40 into 8-bit bytes for provision to the MAC 32.

During receptions from the medium 24, the DPC 36 communicates with the MAC 32 through a novel handshake which facilitates the efficient storage of data in the buffer memory 38. Similarly, during transmissions to the medium 24, the DPC 36 communicates with the MAC 32 through a novel handshake which permits the MAC 32 to ascertain the appropriate time for terminating a transmission in the event that termination is required.

A RAM buffer controller (RBC) 42 generates addresses to the (RAM) buffer memory 38 for storage of packets which have been received from the medium 24 and for retrieval of packets which are to be transmitted to the medium 24. The illustrative drawings of FIG. 5 show details of the RBC 42. It includes three direct memory access (DMA) channels for handling requests from the Host 22, the DPC 36 and a Node Processor (NP) 44. The RBC 42 also includes a memory arbitrator 46 for arbitrating requests for access to the buffer memory 38. It will be appreciated that the drawings of FIG. 5 are merely illustrative and are provided to show that the buffer memory 38 can be addressed by three different entities.

The buffer memory is capable of inputting and outputting 32-bit data words at a rate of 200 megabits per second. The transfer rate on respective buses 34, 40 and 48 (discussed below), however, is only 100 megabits per second. The Host 22 and NP 44 take advantage of this speed differential by using "cycle stealing" to gain fast access to the memory 38. In the course of the storage or retrieval of data to or from the memory 38 by the DPC 36, the Host 22 or NP 44 can access the memory 38 by "stealing" cycles.

As explained more fully below, the MAC 32, DPC 36 and RBC 42 cooperate in data transfers from the medium 24 to the memory 38 so as to enable the buffer memory 38 to behave like a wrap-around FIFO. The MAC 32, DPC 36 and RBC 42 also take advantage of a linked chain structure in which packets are stored for transmission onto the medium 24 to notify the MAC 32 each time a complete packet of data has been transmitted.

Referring once again to FIG. 2, the NP 44 controls the overall operation of the data interface 26. The NP 44 communicates with the other constituents of the data interface 26 using NP-bus 48. The main function of the NP 44 is to initialize the devices comprising of the data interface 26, and to respond to various system level and packet level interrupts. At any given time, the NP 44 is assumed to have complete control over and knowledge of the states of the RBC 42, DPC 36, MAC 32 and buffer memory 38. Each of these devices make its status available to the NP to enable it to maintain control.

The 32-bit D-bus 40 (not including four bits for parity), in addition to providing a data path between the DPC 36 and the buffer memory 38, provides a data path between the buffer memory 38 and the Host 22 and between the buffer memory 38 and the NP 44. As shown in FIG. 2, respective interface logic units 50 and 52 interface the D-bus 40 to the Host 22 and to the NP 44.

The illustrative block diagram of FIG. 6 shows further details of the DPC 32. It includes an internal FIFO 60 that performs the conversion between 8-bit bytes and 32-bit long words. The Y-bus 34 and the D-bus 40 are coupled to the internal FIFO 60.

Respective receiver and transmitter state machines 64 and 66 and FIFO control 68 control the reception and transmission of data through the DPC 36. The state machines 64 and 66 also control DPC interaction during RBC handshake protocols and MAC handshake protocols. RBC handshake logic 72 completes sequential handshake protocols between the DPC 36 and RBC 42. MAC handshake logic 76 completes handshake protocols between the MAC 32 and the DPC 36.

A length counter 70 counts the number of 8-bit bytes transferred through the DPC 36 during transmits and receives. The length counter 70 is coupled to the D-bus 40 to facilitate storage of length as status information during receptions from the media 24 and to notify the RBC 42 as to the address of a next packet in a linked chain of packets during transmits to the media 24.

The buffer memory 38 is separated into two distinct areas. A Receive Area stores data packets which have been received from the medium 24. A Transmit Area stores data packets which are to be transmitted to the medium 24.

Referring to the illustrative drawings of FIG. 7, there is shown a representation of the organization of data in the Receive Area of the buffer memory 38. In short, the data are conveniently organized as a FIFO. It will be appreciated that data packets extracted from the Receive Area typically are used by the Host 22 or the NP 44.

More specifically, data packets are stored contiguously with each other, and within each data packet, long words of data are stored contiguously with each other. Each data packet begins with a corresponding 32-bit long word which provides status information. The status information includes the length of the corresponding packet in terms of the number of 8-bit bytes contained in the packet. As explained below, the present invention provides a novel method for receiving data packets from the medium 24 and for storing the data packets in the buffer memory 38 such that the stored data in the Receive Area are organized as a FIFO.

The illustrative drawings of FIG. 8, show the organization of data stored in the Transmit Area of the buffer memory 38. Data packets are stored in the Transmit Area as a linked chain of packets. Each respective packet begins with a long word that provides status information about the packet including the length of the packet. The data follow the status information. For each packet a pointer follows the data. The pointer points to the address in the Transmit Area of the next packet in the chain to be transmitted.

Packets are stored in the Transmit Area under control of the Host 22 or the NP 44. Storage in a linked chained facilitates efficient usage of limited memory space in the buffer memory 38. More particularly, under certain conditions, it is necessary to repeatedly transmit certain packet(s). The organization of data in linked chains permits the storage of packets which must be transmitted repeatedly in a loop structure form. For example, the FDDI Standard specifies that when the network is initialized, each station in the ring must "bid" for priority. Each station presents its "bid" by repeatedly transmitting to the medium 24 its own claim packet. This claim packet is compared in a manner specified in the FDDI Standard with claim packets from other stations in order to establish a hierarchy of priority for access to the medium 24.

The protocol handshake between the MAC 32 and the DPC 36 facilitates the storage of received data packets in the buffer memory 38 such that data in the Receive Area is organized as a FIFO. That is, through the protocol, the status information corresponding to a received packet including the length of the received packet is stored in buffer memory 38 contiguously with the data of the packet at the beginning of the packet. Storage of the status information at the beginning of the packet is significant since the data of the packet are stored serially within the buffer memory in the sequence in which they are received, and since the status information is transferred from the MAC 32 after the data corresponding to that status information already have been stored in the memory 38. The protocol handshake between the MAC 32 and the DPC 36 facilitates the identification of the status information so that the RBC 42 can cause that information to be stored at the beginning of data which have already been sequentially stored in memory 38 in the order in which they were received.

The illustrative timing diagram of FIG. 9, shows details of the protocol handshake between the MAC 32 and the DPC 36 used during the reception of data. When the MAC 32 detects a received packet on the media 24, it transitions signal RECEIVE from lo to hi. When valid data appears on Y-bus 34, the MAC 32 transitions signal DAVALID (Data Valid) from lo to hi. The DPC 36 detects these transitions, and in response, one clock cycle after they are both hi, it transitions signal BRCVPKT (Begin Receive Packet) from lo to hi, where it remains for only one clock cycle.

The DPC 36 provides BRCVPKT so as to notify the RBC 42 of the fact that a hi state DWRREQ (DPC Write Request) which will soon follow will be a request to store a first long word of a received packet. At the same time, the DPC 36 provides to the RBC 42 hi state signal DISNHRQ which requests the RBC 42 to disable the NP 44 and the Host 22 from accessing the buffer memory 38.

During the time period when the Host 22 and the NP 44 are disabled from using the buffer memory, the RBC 42 calculates the start address for storage of received data packets. The Host 22 and NP 44 are disabled from accessing the buffer memory 38 while the RBC 42 calculates the start address because otherwise their accessing of the memory might interfere with the timely calculation of the start address. In accordance with the FDDI Standard, the MAC 32 and therefore, the buffer memory 38 must be prepared to receive packets immediately when the MAC 32 receives them. After the start address has been calculated, DISNHRQ transitions from hi to lo, and the Host 22 and the NP 44 can once again access the memory 38.

Signal DWRREQ is provided by the DPC to the RBC to request it to address a memory location for storage of a 32-bit long word to be transferred from the internal FIFO 60 of the DPC to buffer memory 38. Signal DWRREQ persists until the RBC 42 acknowledges to the DPC, through signal DWRACK, that the DPC 36 can transfer to the RBC the long word. Data is transferred from the internal FIFO 60 of the DPC 36 to the buffer memory 38 via D-bus 40. The sequence of DWRREQ and DWRACK signals continues until an entire packet of data has been transferred.

When the MAC 32 is about to transfer the status information which it has generated, it transitions signal RECEIVE from hi to lo, and it transitions signal DAVALID from hi to lo for one clock cycle, and then it transitions DAVALID back from lo to hi for another clock cycle. RECEIVE stays low during the transition of DAVALID back to hi. It then transfers to the DPC 36 the status information. The transition of DAVALID just described informs the DPC 36 that the MAC 32 has completed the reception of an entire data packet, and that what follows is status information corresponding to that packet.

In response to this transition of DAVALID, the DPC 36 causes signal DISNHRQ to once again transition from lo to hi. Consequently, access to the buffer memory 38 by the Host 22 and the NP 44 is disabled.

The DPC 36 also transitions signal ERCVPKT (End of Received Packet) from lo to hi to inform the RBC 42 that the long word that will be transferred is status information for the packet. In response, the RBC moves its internal pointer to before the start location in memory of the data in the packet, so that the status information can be stored contiguously with that packet and at the beginning of it.

The DPC 36 then provides to the RBC 42 the status information including the calculated length of the packet. The length of the packet is calculated by the DPC 36 through its length counter 70 in the course of the transfer of data in the packet by counting the number of 8-bit bytes transferred to the memory 38 for storage. Once the status information has been stored at the beginning of the packet, the RBC 42 moves its pointer to the end of the packet and awaits transfer of the next data packet to buffer memory 38.

It should be noted that the MAC 32 can cause data to be stored in buffer memory 38 before the MAC determines that the destination of the received data are actually another station. In that case, upon determining that the data are destined for elsewhere, the MAC 32 causes the DPC 36 to instruct the RBC 42 to "flush" the data. To accomplish such a flushing, the RBC 42 moves its internal pointer back to the start of the data to be flushed. Thus, a next received packet of data will be stored on top the "flushed" data packet.

The Transmit protocol handshake between the MAC 32 and the DPC 36 is illustrated in FIG. 10. It advantageously permits the transmission of packets of data on a packet-by-packet basis which can easily be interrupted between packets in the event that packet transmission must be terminated. Packet transmission, for example, may have to be terminated because of expiration of the Token-holding timer. Another reason the MAC 32 needs to know the end of the packet is so that it knows when to add postamble information to the transmitted packet.

The DPC transitions signal MEDREQS (Media Request-Synchronous) from lo to hi in order to provide a media request for a transmission to the media 24 of a synchronous packet. Signal MEDREQS remains in a hi state until all synchronous data packets to be transferred have been transmitted to the media 24. Thus, even if transmission is interrupted for some reason, signal MEDREQS remains hi until transmission of all packets is complete.

Upon capturing from the medium 24 a Token, the MAC 32 transitions signal XMEDAVS from lo to hi. Signal XMEDAVS indicates to the DPC 36 that the media 24 now is available to for the transmission of packets. In response, the DPC 36 transitions signal DRDREQS (DPC Read Request-Synchronous) to a hi state in order to request permission from the RBC 42 to read a data packet from the buffer memory 38. In response, the RBC 42 transitions signal DRDACKS to a hi state to acknowledge the read request.

The buffer memory 38 then transfers the first long word containing digital status information from the buffer memory 38 to the DPC. The DPC 36 extracts the length of the packet from the first long word of the packet which comprises the status information for the packet. The DPC 36 then proceeds to receive from the buffer memory 38 the packet data.

The DPC 36 stores each 32-bit long word transferred from memory 38 in its internal FIFO 60. It transfers the stored long word from its internal FIFO 60 to the MAC 32 one 8-bit byte at a time. The internal FIFO 60 can store two long words at a time. As one long word is received by the internal FIFO 60 from the buffer memory 38, a previously received long word is transferred from the internal FIFO 60 to Y-bus 34 for transfer to the MAC 32.

When the DPC 36 has ample data in its internal FIFO 60 to commence the transfer of data to the MAC 32, the DPC 36 transitions signal RDYBYT from lo to hi. The DPC 36, after transitioning signal RDYBYT from lo to hi, actually begins transferring a packet to the MAC 32 after the MAC 32 transitions signal XFRBYT (Transfer Byte) from lo to hi. XMEDAVS, RDYBYT and XFRBYT all remain hi until a complete packet of data has been transferred from the buffer memory 38 to the MAC 32.

At the end of the transfer of an entire packet of data, RDYBYT transitions from hi to lo. The DPC 36 knows when to transition signal RDYBYT from hi to lo based upon the length of the packet which was extracted from the status information at the beginning of the packet. The DPC 36, through its counter 70, counts the number of 8-bit bytes transferred through it to the MAC 32. When the number of transferred bytes equals the length of the packet indicated in the packet's status information, it transitions signal RDYBYT from hi to lo.

The transitioning of signal RDYBYT from hi to lo informs the MAC 32 that an entire packet has been transferred. The FDDI Standard requires that transmission of packets be interruptable, but it also requires that a transmission not be interrupted until an entire packet has been transferred. The transition of RDYBYT from hi to lo after each packet informs the MAC 32 as to when an interruption of a transmission can occur in accordance with the FDDI Standard.

After the transmission of an individual packet, and the transitioning of signal RDYBYT from hi to lo, the MAC 32 causes signals XMEDAVS and XFRBYT, to transition from hi to lo. Subsequently, in the event that the MAC 32 is ready to receive another packet, it causes signal XMEDAVS to transition once again from lo to hi. In response, the DPC 36 initiates the exchange of signals DRDREQS and DRDACKS with the RBC 42. Upon receiving ample data in its internal FIFO 60, the DPC causes signal RDYBYT to once again transition from lo to hi. In response, the MAC 32 transitions XFRBYT from lo to hi, and another complete data packet is transferred.

This cycle continues until all of the packets in a given linked chain have been transferred. The MAC 32, then can cause another linked chain of packets to be transferred. Alternately, it can pass the Token to another station.

The illustrative drawings of FIG. 11, provides a timing diagram showing a sequence of signals used in the protocol handshake between the MAC 32 and the DPC 36 to transmit from buffer memory 38 to the medium 24 multiple packets of data in which some packets are synchronous and others asynchronous. The FDDI Standard distinguishes between synchronous and asynchronous packets. The Standard ordinarily requires that synchronous packets be transmitted before asynchronous packets.

The DPC 36 first transitions signal MEDREQA (Media Request Asynchronous) to a hi state. In response, the MAC 32 transitions XMEDAVA to a hi state. The DPC 36 and the RBC 42 exchange DRDREQA and DRDACKA signals. Subsequently, signal RDYBYT transitions from lo to hi to indicate that asynchronous data are stored in internal FIFO 60 of the DPC 36 and are ready for transfer to the MAC 32. The MAC 32 responds by transitioning signal XFRBYT from lo to hi so as to cause a transfer of a packet of asynchronous data.

In the meantime, the DPC 36 transitions to the signal MEDREQS to a hi state. Thus, a transfer of synchronous data has been requested. As mentioned above, synchronous transmissions take precedence over asynchronous transitions. Consequently, after the transfer of one complete packet of the chain of asynchronous data, the MAC 32 transitions signal XMEDAVA from hi to lo, and transitions signal XMEDAVS from lo to hi. Thus, on the next transition of signal RDYBYT from lo to hi, the data available in the DPC 36 is synchronous data. Consequently, upon the next transition from lo to hi of signal XFRBYT, synchronous data is transferred from the internal FIFO 60 of the DPC 36 to the MAC 32. The transfer of synchronous data continues until each and every packet of synchronous data has been transmitted from the DPC 36 to the MAC 32. The transfer of the chain (CS1) of synchronous packets is completed at arrow 1.

Following the completion of the transmission of the first chain (CS1) of synchronous packets, the transmission of the first chain (CA1) of asynchronous packets continues with the transmission of the second packet in that chain. Transmission continues until the completion of the first chain (CA1) of asynchronous packets which is indicated by arrow 2.

Subsequently, additional synchronous chains (CS2, CS3) and another asynchronous chain (CA2) are transmitted.

In the course of transferring the packet from the DPC 36 to the MAC 32, the DPC counts the number of bytes transferred. When the last byte occurs, the DPC 36 knows that that byte is the pointer to the start address of the next packet in the chain. The DPC 36 indicates to the RBC 42 via hi state signals DRDREQS and LDRPXS that the address of the next packet is present on the D-bus 40. The RBC 42 stores that address and will use it for the next hi signal DRDREQS (i.e. for the next packet). (For asynchronous packets, signals DRDEQA and LDRPXA are used).

It will be understood that the above-described embodiment is merely illustrative of any possible specific embodiments and methods which can represent the principles of the invention. Numerous and varied other arrangements can readily be devised in accordance with these principles without departing from the spirit and scope of the invention. Thus, the foregoing description is not intended to limit the invention which is defined in the appended claims in which:

What is claimed is:

1. A method for use in a Token ring network including a plurality of stations serially connected by a transmission medium so as to form a closed loop on which packets of data are circulated, wherein each respective station includes media access controller means for scheduling and routing data transmissions on the transmission medium, buffer memory means for storage of information, and processor means for controlling operation of the respective station, the processor means having access to the buffer memory means, the method comprising the steps of:

transferring data of a respective packet from a media access controller means of a respective station to the buffer memory means of the respective station;

storing the data in a sequence of contiguous memory locations in the buffer memory means;

in the course of said step of transferring the data, generating status information for the data; and after said step of storing the data, storing the status information in the buffer memory means contiguously with the stored data at the beginning of the sequence of memory locations in which the data are stored.

2. The method of claim 1 and further including the step of:

after said step of transferring data, notifying the buffer memory means of the transfer of at status information.

3. The method of claim 2 and further comprising the step of:

after said step of notifying, calculating a memory location in the buffer memory means for the storage of the status information.

4. The method of claim 3 wherein said buffer memory means performs the step of calculating; and further comprising the step of:

in the course of said step of calculating, preventing the processor means from accessing the buffer memory means.

5. The method of claim 4 and further comprising the step of:

before said step of storing the data, calculating a memory location in the buffer memory means at which the storage of the data will begin; and in the course of calculating the memory location where storage of the data will begin, preventing the processor means from accessing the buffer memory means.

6. The method of claim 1 wherein said step of generating includes calculating a length of the respective packet.

7. The method of claim 6 wherein the status information includes the calculated length.

8. A method for use in a Token ring including a plurality of stations serially connected by a transmission medium so as to form a closed loop on which packets of data are circulated, wherein each respective station includes media access controller means for scheduling and routing data transmissions on the transmission medium, buffer memory means for storage of information, and processor means for controlling operation of the respective station, the processor means having access to the buffer memory means, the method comprising the steps of:

transferring a sequence of respective data packets from a media access controller means of a respective station to the buffer memory means of the respective station;

storing the respective data packets contiguously in the buffer memory means such that the data packets are stored sequentially in the buffer memory means in the order that the data packets are transferred from the media access controller means to the buffer memory means;

for each respective data packet, in the course of said step of transferring that respective packet, generating respective status information corresponding to that respective data packet;

for each respective data packet, after storing the respective data packet and before storing a next respective data packet in the sequence, storing in the buffer memory means the respective status information corresponding to that respective data packet;

wherein for each respective stored data packet, respective status information corresponding to that respective stored data packet is stored contiguously with and at the beginning of that respective stored data packet.

9. A method for use in a Token ring network including a plurality of stations serially connected by a transmission medium so as to form a closed loop on which packets of data are circulated, wherein each respective station include media access controller means for scheduling and routing data transmissions on the transmission medium, buffer memory means for storage of information, and processor means for controlling operation of the respective station, the processor means having access to the buffer memory means, the method comprising the steps of:

storing a plurality of packets of data buffer memory means of a respective station, each respective packet of the plurality is stored with respective corresponding status information at the beginning of the packet, the status information including a length of the respective packet;

requesting that media access controller means of the respective station accept a transfer from the buffer memory means of at least one of the plurality of packets;

capturing a token from the closed loop in order to enable transfer from the buffer memory means of at least one of the plurality of packets;

transferring from the buffer memory means to the media access controller means at least one of the plurality of packets;

for each respective packet, in the course of transferring the respective packet, calculating the length of the respective packet that has been transferred and comparing the calculated length with the length included in status information for the respective packet in order to determine when the respective packet has been completely transferred from the buffer memory means to the media access control means; and, for each packet transferred from the buffer memory means to the media access controller means, notifying the media access controller means of the transfer of that packet before transferring a next packet of the plurality.

10. The method of claim 9 wherein said step of requesting continues until every packet of the plurality has been transferred from the buffer memory means to the media access controller means.

11. The method of claim 9 and further comprising the step of:

for each respective packet of the plurality, before transferring that respective packet, notifying the buffer memory means that the media access controller means is available to accept a transfer of that respective packet.

12. The method of claim 9 wherein each respective packet is stored in the respective buffer memory means with a respective pointer to a respective next packet of the plurality, the respective pointer being stored substantially at the end of the respective packet; and further including the step of;

addressing the next respective packet in the memory using the respective pointer to the next respective packet.

* * * * *